UNITED STATES PATENT OFFICE.

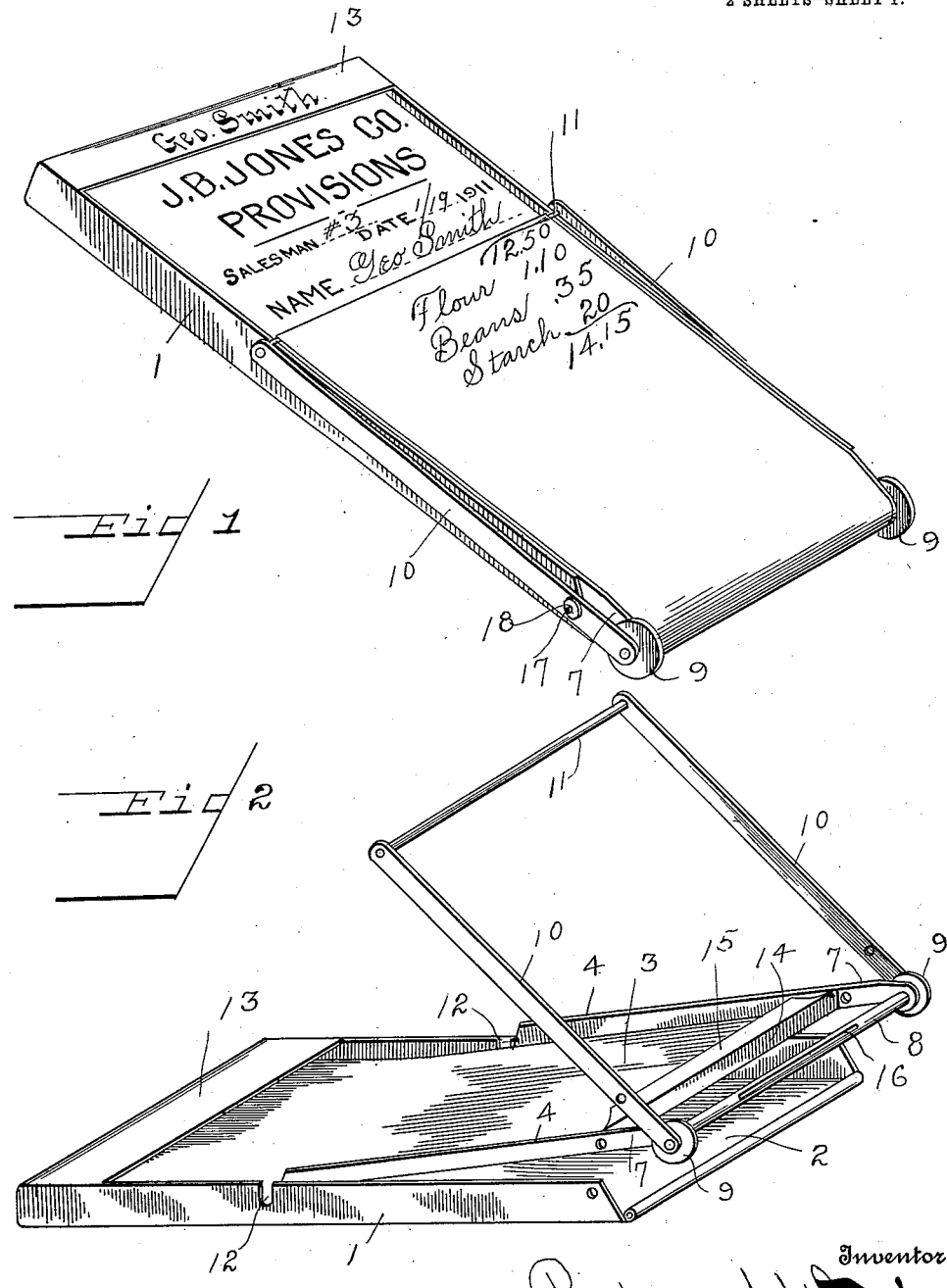

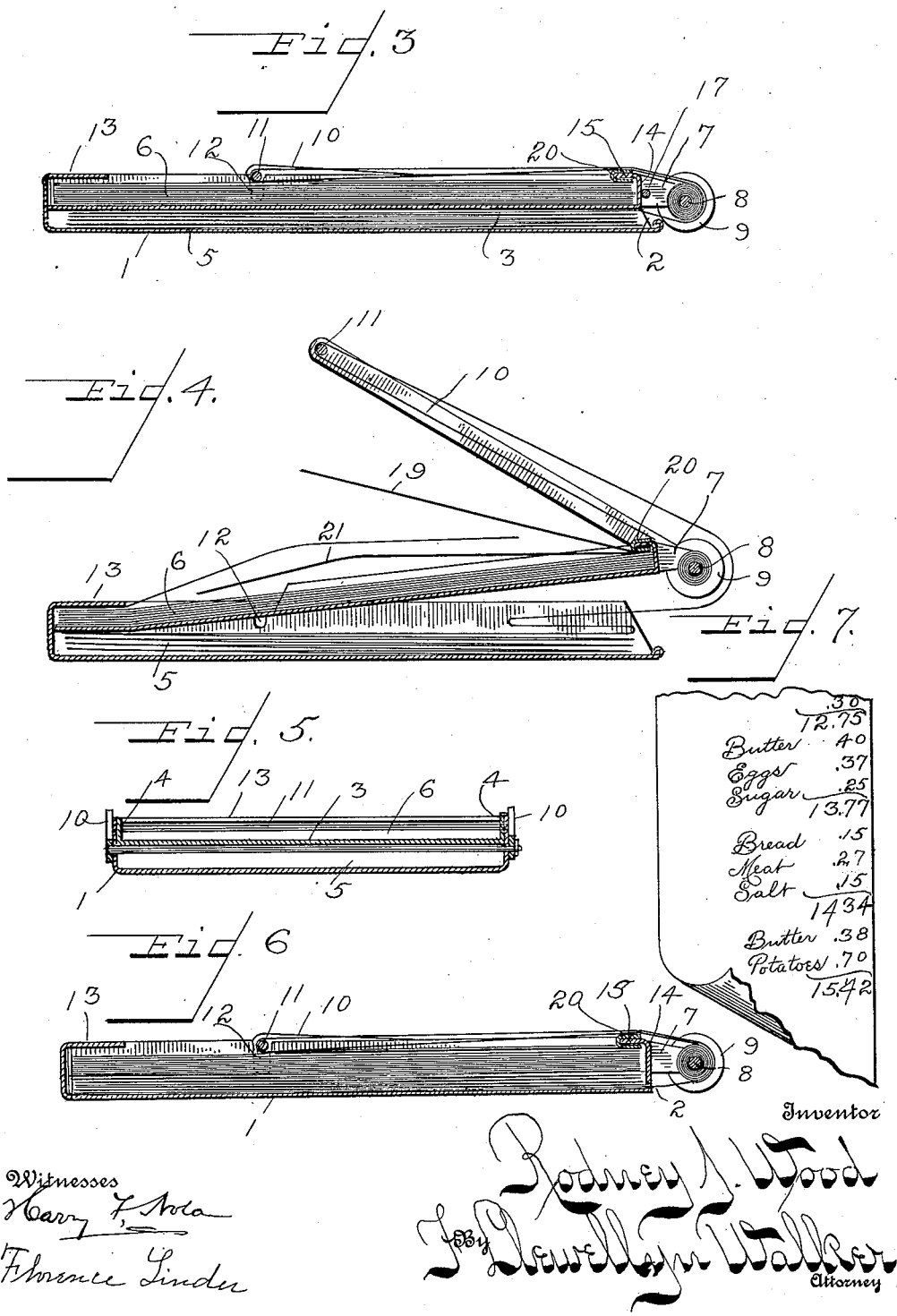

RODNEY J. WOOD, OF DAYTON, OHIO, ASSIGNOR TO FAYETTE H. WOOD, OF DAYTON, OHIO.

MANIFOLDING SALES-BOOK.

1,023,910.        Specification of Letters Patent.        Patented Apr. 23, 1912.

Application filed January 23, 1911. Serial No. 604,078.

*To all whom it may concern:*

Be it known that I, RODNEY J. WOOD, a citizen of the United States, residing at Dayton, in the county of Montgomery and State of Ohio, have invented certain new and useful Improvements in Manifolding Sales-Books, of which the following is a specification.

My invention relates to accounting systems and sales recording devices, and more particularly to a credit sales record system and a sales book, or manifolding sales register, by which the system may be carried out. The device, herein described is adaptable to either a system of accounting where it is desired to keep a continuous total record of each customer's purchases in consecutive order, or to a system where it is desired to keep a continuous total consecutive record of each clerk's sales.

The object of the invention, is to provide a simple efficient and comprehensive system by which the separate items of particular customers' purchases together with a total of the previous transactions may be instantly ascertained, or by which an itemized record of a clerk's sales may be had with the total of such sales all contained on a continuous original record strip, in addition to duplicate sales slips of each transaction to be sent to the cashier or given to the customer.

A further object is to provide a suitable holder or sales book convenient in form, easily and quickly operated, and unlikely to get out of repair, in which to carry in proper relation with each other the continuous record strip and the separate or individual sales slips.

With the above primary and other incidental objects in view as will more fully appear in the specification, the invention consists of the features of construction, the parts and combinations thereof, and the system or mode of operation, or their equivalents, as hereinafter described and set forth in the claims.

Referring to the drawings Figure 1, is a perspective view of the manifold sales recording device, with the continuous strip and sales slips in place, the device closed and in condition for use. Fig. 2, is a perspective view of the holder or case for the sales slips and record strip empty, with the parts opened as in condition for filling. Fig. 3, is a longitudinal sectional view of the device in its closed condition. Fig. 4, is a longitudinal sectional view showing the parts in their extended or opened positions. Fig. 5, is a transverse sectional view of the empty case showing the locking pin. Fig. 6, is a longitudinal sectional view of a modification of the recording device. Fig. 7, is a detail view of a fragment of the continuous original record strip.

Like parts are indicated by similar characters of reference throughout the several views.

Referring to the drawings 1, is a case or housing open on its upper side and likewise at one end as shown at 2. Located within the housing 1 is a movable partition 3, which may be either pivoted within the housing 1, or may be secured rigidly thereto at the closed end of said housing 1. The said partition 3 in the latter case is made flexible whereby, it may be moved upward away from the housing 1, as shown in Figs. 2 and 4. The partition 3, is provided with side walls 4 throughout a portion of its length forming thereby a secondary holder. The partition 3 normally divides the housing or casing 1 into a lower compartment 5, in which is contained the supply portion of the continuous original record strip and an upper compartment 6 adapted to contain a supply of separate or independent sales tickets upon which the duplicate record of the transaction is made by means of an interposed transfer sheet.

The upper compartment 6, comprising the partition 3, and side walls 4, terminates in two parallel projecting arms 7 in which is journaled a transverse revoluble shaft 8. At each end of the shaft 8 is secured a roller or wheel 9, by means of which the shaft 8 may be rotated. Also pivoted upon the extremities of the shaft 8 are two parallel swinging arms 10, connected at their extremities by a transverse rod or wire 11, thereby forming a swinging frame movable to and from the main housing, about its pivotal connection with the shaft 8. The side walls of the housing or casing 1 are recessed as at 12, within which recess the transverse rod 11 engages when the parts are in closed position, as shown in Figs. 1 and 3. One end of the main casing or housing 1 is provided with an overhanging ledge or lip 13. At the opposite end the secondary holder formed by the partition 3 and side walls 4 is provided with an end wall 14 also having an inward projecting ledge or lip 15. The shaft 8 is provided with a longitudinal slot 16, through which the end of the original continuous record slip may be attached to the shaft. It is obvious that other means might be provided for attaching the strip to the shaft 8, without departing from the principle of the invention.

In order that the holder may be locked in its closed position to prevent tampering therewith, there is provided a transverse locking pin 17, extending through suitable openings in the swinging arms 10, the arms 7 of the secondary holder, and preferably also, through the side walls of the main housing or the casing 1. The pin 17, is provided with a suitable locking or sealing device, 18 which will prevent the removal of the locking pin, except by some authorized person. By this means the device may be secured in its closed position to prevent tampering with the record strip after it has been advanced beyond the point of original entry of the transaction.

As before stated the device, is adapted to produce two or more records of each transaction the original record being made on a continuous record strip and the duplicate records being made by the usual carbon transfer process onto separate or individual sales tickets.

In preparing the device, for use a quantity of the separate sales tickets are placed in the upper compartment 6, with their one end projecting under the overhanging ledge or lip 13, and their opposite ends engaged under the inward projecting lip 15. The supply portion of the continuous record strip is folded throughout a series of reverse bends into a compact packet which is placed within the lower compartment 5 of the housing. The forward end of the continuous record strip is drawn from the compartment 5, and passed outward around the shaft 8, thence over the transverse rod 11, supported in the arms 10, and back to the shaft 8, to which it is secured by being passed through the slot 16, and rolled a few turns upon the shaft. The rotation of the shaft 8, by means of the wheel or rollers 9, secured thereon reels the used portion of the strip upon the shaft 8, at the same time drawing a further supply from the compartment 5. The carbon transfer sheet 19, may be secured by any suitable means to the secondary holder. In the drawings the strip is shown secured to the inward projecting lip 15 by means of a U shaped bar 20, engaging over the said lip 15, and removably clamping the extremity of the transfer sheet 19, between said bar 20 and the lip 15. This construction will be particularly clear by reference to Fig. 4. It will be seen that when the device is closed there will be a double thickness of the original or continuous record strip above the transfer strip 19, and that any entry made upon the upper surface of the continuous record strip as shown in Fig. 1, will be reproduced by the transfer sheet 19, upon the uppermost of the sales tickets or slips within the secondary holder or compartment.

The sales tickets within the compartment 6 extend sufficiently above the continuous record strip, to provide space on the exposed portion for the usual business heading with a blank space for the name of the customer, the date, and the name or number of the salesman.

When the device is to be used in connection with a credit sales system such as would be employed in a grocery, meat market, or similar establishment, the merchant would provide himself with one of the register devices as heretofore described for each of his credit customers. The device would have inscribed thereon, preferably upon the ledge or lip 13, the name of the particular customer whose account is contained in the register. These register devices, each one locked as before described to prevent the inspection of the record or the tampering therewith by unauthorized persons would be kept in a suitable rack or container. When the customer enters the store to purchase goods, the clerk selects the register account recorder of that particular customer, and proceeds to enter the name of the customer the date, and his, the clerk's, number on the exposed portion of the uppermost sales slip. He then enters on the continuous record strip the several items purchased by the customer as shown in Fig. 1. These items are transferred by the carbon transfer sheet 19, to the uppermost sales slip. He now adds the several items to the previous total which shows at the upper edge of the continuous record strip, which is shown in Fig. 1 to be twelve dollars and fifty cents, draws a line and enters the sum total which as shown in the example is fourteen dollars and fifteen cents, on the original record strip. This is also transferred by the carbon sheet to the duplicate sales slip which is handed to the customer. Such total represents the total indebtedness of the customer. If it is not desired that the total indebtedness of the customer shall be shown on the customer's sales slip, the clerk will withdraw the sales slip after having made the entry of the several purchases, but before entering the sum total thereof, upon the continuous record strip. Thus the customer receives a sales slip for each transaction; the original entries of the sundry transactions being retained by the merchant, on the continuous record strip the account being always totaled to date. The clerk then turns the wheels or rollers 9, to rotate the shaft 8 and reel the used portion of the record strip thereon, until the last total appears at the top of the continuous record strip, just before passing around the wire 11. The device is then in condition for the next transaction, the several items of which will be added to the last total and a new total entered on the sheet as before. One of the advantages of this system, is the rapidity with which the sales may be entered, there being no cover to interfere with the entry of the sales as is usual in sales books; it is not necessary for the clerk to handle the carbon paper; it is not necessary to transfer totals of the past account, thereby not only saving time but reducing the liability of error. The sales slips being loose in the holder are easily and quickly removed. Further by this system the merchant retains the original record, which being on a continuous strip becomes a consecutive sales record. When separate sales slips are used for the merchant's record, such slips are apt to be mislaid or lost from the files, or a dishonest clerk may destroy the duplicate sales slip which he should send to the cashier, thereby resulting in a loss to the merchant. The difficulty is obviated by the system hereinbefore described through the use of the continuous original record strip, upon which the clerk must enter his sales in order to produce the duplicate copy of the sales slip for the customer. The original entries being made on the continuous strip it is impossible for the clerk to withhold the record of any particular transaction, and further the device, being locked the clerk is unable to make any change in the record after it has passed over the transverse wire 11. It will be noted that the used portion of the continuous record strip is reeled upon the shaft 8, within the bight formed by the advancing supply portion of the continuous strip. Thus the blank or plain portion of the strip being pulled from the compartment 5, passes around roll upon the shaft 8, inclosing same and protecting it against any possible change by the clerk. The friction of the continuous strip passing from the compartment 5, around the rolled used portion thereof, will be sufficient to maintain the shaft 8, and the rolled portion of the strip thereon in their adjusted position, without the necessity of holding ratchets or pawls.

When the merchant desires to inspect the account he unlocks the device, and turns the frame formed by the arms 10, and wire 11 outward. By pulling on the continuous strip he can readily unroll the used portion thereof from the shaft 8. After inspecting the account, he may either rewind the strip by rotating the wheels 9, by hand or, a more convenient way for rewinding the strip is to push the device, across a desk or counter with the wheels 9, in contact therewith. This will cause the shaft 8, to rotate and the strip to be rewound much more rapidly than same can be done by hand.

When it is desired to use the system and device herein described as a clerk's sales record, such as in a department store where only cash business is done, one of the devices will be provided for each clerk, in the same manner as the clerk's sales books now commonly in use. In a cash sales system triplicate copies are usually desired; first the sales slip which goes to the customer; second a duplicate sales slip sent to the cashier's desk, and third the clerk's daily record of sales.

In employing the device herein described in such a system it is not necessary that the device shall be locked since the duplicate sales slips sent at the time of each transaction to the cashier, will serve as a check to prevent the clerk afterward changing the daily sales record, which is made on the continuous record strip. In order to produce two sales slips a second carbon transfer sheet 21 is provided secured to the inward projecting lip 15, by the U shaped bar 20, in the same manner that the transfer sheet 19. is secured. After each transaction the clerk raises the frame carrying the continuous record strip and lifts the uppermost sales slip allowing the carbon transfer sheet 21 to fall below the sales slip, which he places in position between the carbon transfer sheets 19 and 21, and returns his book to closed condition. Upon making a sale he enters the date, his number and the amount of money tendered upon the exposed head of the sales slip, such items being transferred by the carbon transfer sheet 21 to the cashier's slip. He then enters the particular items comprising the transaction and their prices on the original continuous record strip. This entry will be transferred by the carbon transfer sheet 19, to the first sales slip and thence by the second carbon transfer sheet 21, to the second sales slip. Since it is not desired that the total of the clerk's sales for the day shall appear upon the sales slip presented to the customer, the clerk before entering such total removes the first slip or customer's sales slip, then draws a line on the original record strip and adds the last transaction to the last total appearing upon his continuous original record strip, which total is transferred by the said transfer sheets, to the cashier's sales slip still remaining in the device. This second sales slip is then removed and sent to the cashier's desk. Such sales slip showing not only the items of the transaction, but also that particular clerk's sales for the day. Thus at the end of the day's business the footing on the last sales slip sent to the cashier's desk will represent the total day's sales for that clerk, as will also the last total appearing upon the continuous original record strip of the clerk's sales register device.

As usually constructed clerk's sales books have a daily sales record in the back of the book, to which the clerk must turn in order to enter the amount of his sale after each transaction. During a rush business this is frequently overlooked. With the system herein described, but one entry of the items is required, the clerk making his continuous sales record for the day at the same time that he makes the duplicate record for the customer and the cashier.

It is obvious that instead of employing two carbon transfer sheets 19, and 21, the backs of the sales slips may be coated with transfer material as is now commonly done, and the transfer sheet 21 dispensed with. This might be made to serve as an additional check against the dishonesty of the clerk, by making the two carbon transfers of different colors. For instance the carbon transfer sheet 19, in such case might be red and the carbon backing on the customer's sales slip might be black. In such case the clerk entering the items of his sale, on his continuous record strip would cause such items to appear on the customer's slip in red, and on the cashier's slip in black. Then withdrawing the customer's slip as before mentioned and entering on his record strip the total of his sales, such total would be made to appear on the cashier's slip in red. By this means any attempt to make the customer's slip appear differently from the cashier's slip, and the clerk's daily record, would be evident. If he should remove the customer's slip and make it out for a different amount than that which he entered on his sales record the entire entry on the sales record both the items of the transaction, and total of sales would be transferred to the cashier's slip in the same color, indicating that the proper system had not been followed.

By the system herein described the merchant by noting the total on the last sales slips sent to the cashier, can determine the total amount of business transacted at any time during the day, without the necessity of adding all transactions. The system will reduce the work of auditing sales slips to minimum. This system can be made to furnish as many facsimile records as may be desired, and all through a single entry by the clerk.

In Fig. 6, is shown a modification of the sales recording device in which the intermediate partition 3 has been omitted, the supply of sales slips resting directly upon the folded supply portion of the continuous strip.

From the above description it will be apparent that there is thus produced an accounting system of the character described and a sales recording device for carrying out such system possessing the particular features of advantage before enumerated as desirable, but which obviously is susceptible of modification in its form, proportion, detail construction, and arrangement of parts without departing from the principle involved or sacrificing any of its advantages.

Having thus described my invention I claim.

1. In a sales recording device, a holder having a plurality of stationary separable sales slips and a movable continuous record strip contained therein, means for moving the continuous record strip across the sales slips in a direction from the bottom to the top thereof whereby successive entries on the record strip may be made in a vertical column and transfer means for producing a duplicate record upon the uppermost of the separate sales slips.

2. In a sales recording device, a holder having a plurality of separable sales slips contained therein, a continuous record strip also contained in said holder, means adapted to feed the strip therefrom through successive movements of any desired length independent of its relation with the sales slips, a guide over which the continuous strip passes in a direction from the bottom to the top of the sales slips and over the same and transfer means whereby an entry made upon the continuous strip is reproduced upon the sales slip beneath.

3. In a sales recording device, a holder having a plurality of stationary separable sales strips contained therein, a continuous record strip also carried by said holder, a reel upon which the used portion of said strip is collected, a guide member overlying the separable sales strips in transverse relation therewith, means for causing the continuous strip to move in a path from the bottom toward the top of the sales slips and independent of said slips thence over said guide member and in the opposite direction from said guide member toward the bottom of the sales slips and transfer means whereby the entry made upon the continuous slip is reproduced upon the sales slip beneath.

4. In a sales recording device, a holder, having the supply portion of a continuous record strip contained in the holder, a reel journaled on the holder and adapted to receive the used portion of the record strip, said reel being located in a bight of the unused portion of the strip whereby the used portion thereof contained upon the reel will be concealed from view by the unused bight extending about the reel.

5. In a sales recording device, a holder, having the supply portion of a continuous record strip contained in the holder, a reel adapted to receive the used portion of the record strip, a guide for the continuous record strip, the reel being located between the guide and the point of exit of the strip from the holder, whereby the strip will be conducted around the reel to a point beyond the reel and thence returned to the reel in reverse direction beneath the advancing unused portion of the strip, whereby the used portion thereof will be concealed from sight.

6. In a sales recording device, a holder adapted to carry a plurality of stationary sales slips and a movable record strip, means for advancing the movable record strip through successive movements of any desired length independent of the sales slips in a direction from the bottom toward the top of said sales slips thence through a reverse bend and in a direction toward the bottom of the sales slips, and transfer means for producing a duplicate copy on the sales slip, substantially as specified.

7. In a sales recording device, a housing, adapted to contain a supply of separable sales slips, and the supply portion of a continuous record strip, a revoluble shaft upon which the used portion of the continuous strip is adapted to be reeled, means for causing the continuous strip to follow a reverse bend in its travel from the housing to the reel, said reverse bend extending above the separable sales slips whereby a fold of double thickness of the continuous strip will overlie the sales slips.

8. In a sales recording device, a housing adapted to contain a supply of separable sales slips, and a continuous record strip a revoluble shaft upon which the used portion of the continuous strip is adapted to be reeled, two parallel swinging arms pivoted upon said shaft, a transverse guide member carried by the swinging arms over which the continuous record strip passes intermediate the housing and shaft.

9. In a sales recording device, a housing, a diaphragm therein dividing the housing horizontally into two compartments, a revoluble shaft journaled in bearings upon said housing, a swinging frame journaled on said shaft, and means for manually rotating the shaft, substantially as specified.

10. In a sales recording device, a housing, a movable compartment within the housing, a revoluble shaft carried by said movable compartment, overhanging ledges at the opposite ends of said compartment, a swinging frame journaled on said shaft and means to rotate the shaft, substantially as specified.

11. In a sales recording device, a holder adapted to carry a plurality of stationary sales slips and a movable record strip, a swinging frame carried by the holder and overlying the stationary sales slips over which the movable record strip passes in a direction from the pivoted toward the free end thereof, and thence in a reverse direction toward the pivoted end thereof, means for advancing the record strip through successive movements independent of the sales slips, and means for producing a duplicate record upon the sales slip.

12. In a sales recording device, a holder adapted to carry a plurality of stationary sales slips and a movable record strip, a portion of the movable strip overlying the stationary slips, means for advancing the overlying portion of the movable strip through successive movements independent of the stationary slips and thereover, in a predetermined direction, thence through a reverse bend and in an opposite direction substantially parallel to its first direction of movement, and transfer means for producing a duplicate record upon the sales slip, substantially as specified.

13. In a sales recording device, a housing adapted to contain both separable sales slips and a continuous record strip, a revoluble shaft carried by said housing upon which the used portion of the strip is adapted to be reeled, a swinging frame forming a guide for the continuous strip intermediate the housing and shaft, said swinging frame being adapted to be folded substantially to parallelism with the housing, and a transverse removable locking pin adapted to extend through the parallel side arms of the swinging frame and engage with the housing to secure the swinging frame against movement, and means for removably securing the locking pin in position.

14. In a sales recording device, a holder adapted to carry a plurality of stationary sales slips and a movable record strip, a swinging frame the axis of which is arranged transversely to the direction of movement of the movable strip over which the strip passes in a longitudinal path between the free and pivoted ends of said frame, means for advancing the strip through successive movements, and means for producing a duplicate copy upon the sales slip.

In testimony whereof, I have hereunto set my hand this 21st day of January A. D. 1911.

RODNEY J. WOOD.

Witnesses:
 HARRY F. NOLAN,
 F. L. WALKER.

Copies of this patent may be obtained for five cents each, by addressing the "Commissioner of Patents, Washington, D. C."